US007515670B2

(12) United States Patent
Ettorre et al.

(10) Patent No.: US 7,515,670 B2
(45) Date of Patent: Apr. 7, 2009

(54) EARLY-LATE SYNCHRONIZER HAVING REDUCED TIMING JITTER

(75) Inventors: Donato Ettorre, Turin (IT); Maurizio Graziano, Turin (IT); Bruno Melis, Turin (IT); Andrea Finotello, Turin (IT); Alfredo Ruscitto, Turin (IT)

(73) Assignees: Telecom Italia S.p.A., Milan (IT); STMicroelectronics S.R.L., Agrate Brianza (IT)

( * ) Notice: Subject to any disclaimer, the term of this patent is extended or adjusted under 35 U.S.C. 154(b) by 580 days.

(21) Appl. No.: 10/534,992

(22) PCT Filed: Nov. 15, 2002

(86) PCT No.: PCT/EP02/12814

§ 371 (c)(1),
(2), (4) Date: Nov. 16, 2005

(87) PCT Pub. No.: WO2004/047327

PCT Pub. Date: Jun. 3, 2004

(65) Prior Publication Data
US 2006/0251154 A1    Nov. 9, 2006

(51) Int. Cl.
*H04L 7/00* (2006.01)
(52) U.S. Cl. .................. 375/371; 375/354; 375/355; 375/316; 370/320
(58) Field of Classification Search ............... 375/371, 375/354, 355, 316; 370/320
See application file for complete search history.

(56) References Cited

U.S. PATENT DOCUMENTS 5,832,023 A    11/1998   Latva-aho
6,201,828 B1    3/2001   El-Tarhuni et al.
6,330,273 B1 *  12/2001  Hulbert et al. ............... 375/150
6,633,603 B2 * 10/2003  Bultan et al. ................ 375/148
6,795,452 B2 *  9/2004   Iancu ........................ 370/515
2002/0006158 A1 * 1/2002  Schmidl et al. ............. 375/150
2002/0127983 A1 * 9/2002  Black et al. ................. 455/135
2003/0202488 A1 * 10/2003 Hsuan ........................ 370/331

OTHER PUBLICATIONS

Interpolation in Digital Modems—Part I (IEEE Trans. Comm. Mar. 1993).
Interpolation in Digital Modems—Part II by Erup et al.
Digital Communications by G. Proakis (McGraw-Hill, 1995).
"A Digital Chip Timing Recovery Loop . . . " by De Gausenzi (IEEE Trans. Nov. 1993).

* cited by examiner

*Primary Examiner*—Mohammad H Ghayour
*Assistant Examiner*—Leila Malek
(74) *Attorney, Agent, or Firm*—Andrew Wilford (57) ABSTRACT

A device for maintaining fine alignment between an incoming spread spectrum signal and a locally generated code in a digital communication receiver comprises: a delay line for storing a plurality of consecutive samples (E-1, E, M, L, L+1) of the incoming spread spectrum signal; three digitally controlled interpolators for determining by interpolation between consecutive samples an interpolated early sample, an interpolated middle sample, and an interpolated late sample; two correlators for calculating an error signal as the difference between the energy of the symbols computed from the interpolated early and late samples; a circuit for generating a control signal for controlling the interpolation phase of the digitally controlled interpolator for the early sample, and a digital non-linear filter, for smoothing the control signal of the interpolator for the early sample, enabling the update operation of the control signal only when the absolute value of the error signal at a time instant n is smaller than the absolute value of the same error signal at a time instant n−1.

8 Claims, 8 Drawing Sheets

| SEL | Timing offset ($\tau$) | $y_{OUT} = f(y_E, y_M, y_L, SEL)$ |
|---|---|---|
| 4 | $-\dfrac{T_C}{2}$ | $y_{OUT} = y_E$ |
| 3 | $-\dfrac{3 \cdot T_C}{8}$ | $y_{OUT} = \dfrac{y_M + 3 \cdot y_E}{4}$ |
| 2 | $-\dfrac{T_C}{4}$ | $y_{OUT} = \dfrac{y_M + y_E}{2}$ |
| 1 | $-\dfrac{T_C}{8}$ | $y_{OUT} = \dfrac{3 \cdot y_M + y_E}{4}$ |
| 0 | 0 | $y_{OUT} = y_M$ |
| -1 | $\dfrac{T_C}{8}$ | $y_{OUT} = \dfrac{y_L + 3 \cdot y_M}{4}$ |
| -2 | $\dfrac{T_C}{4}$ | $y_{OUT} = \dfrac{y_L + y_M}{2}$ |
| -3 | $\dfrac{3 \cdot T_C}{8}$ | $y_{OUT} = \dfrac{3 \cdot y_L + y_M}{4}$ |
| -4 | $\dfrac{T_C}{2}$ | $y_{OUT} = y_L$ |

Fig. 13

| SEL | Timing offset ($\tau$) | $y_{OUT} = f(y_E, y_M, y_L, SEL)$ |
|---|---|---|
| 2 | $-\dfrac{T_C}{2}$ | $y_{OUT} = y_E$ |
| 1 | $-\dfrac{T_C}{4}$ | $y_{OUT} = \dfrac{y_M + y_E}{2}$ |
| 0 | 0 | $y_{OUT} = y_M$ |
| -1 | $\dfrac{T_C}{4}$ | $y_{OUT} = \dfrac{y_L + y_M}{2}$ |
| -2 | $\dfrac{T_C}{2}$ | $y_{OUT} = y_L$ |

| Timing offset ($\tau$) | $S_E$ | $S_M$ | $S_L$ |
|---|---|---|---|
| $-T_C/2$ | 2 | 4 | 2 |
| $-3 \cdot T_C/8$ | 1 | 3 | 2 |
| $-T_C/4$ | 1 | 2 | 1 |
| $-T_C/8$ | 0 | 1 | 1 |
| 0 | 0 | 0 | 0 |
| $+T_C/8$ | -1 | -1 | 0 |
| $+T_C/4$ | -1 | -2 | -1 |
| $+3 \cdot T_C/8$ | -2 | -3 | -1 |
| $+T_C/2$ | -2 | -4 | -2 |

EARLY-LATE SYNCHRONIZER HAVING REDUCED TIMING JITTER

CROSS REFERENCE TO RELATED APPLICATIONS

This application is the U.S. national phase of PCT application PCT/EP02/12814 filed 15 Nov. 2002 with a claim to the priority of PCT patent application PCT/EP02/12814 itself filed 15 Nov. 2002.

FIELD OF THE INVENTION

The present invention refers to telecommunication systems and in particular to a method for fine synchronization of a digital telecommunication receiver. The invention also relates to a digital receiver for use in a CDMA (Code Division Multiple Access) system.

The CDMA access technique currently finds widespread use in third generation mobile communication systems (e.g. UMTS, CDMA2000) thanks to its higher spectrum efficiency with respect to other access techniques.

In a CDMA system the data sequence is spread by a pseudo noise code (hereinafter "PN code") having a broader spectrum width. The efficiency of these systems is highly dependent on the capability of the receiver to continuously maintain precise phase synchronization between the received and the locally generated PN code.

In fact, without a precise phase synchronization between the received and the locally generated code, the performance loss of the receiver is in the order of several dB even for a mismatch of half of the chip period.

The phase synchronization process is usually accomplished in two steps: code acquisition and code tracking. Code acquisition is the initial search process that brings the phase of the locally generated code to within the chip duration ($T_C=1/F_C$) of the incoming code. Code tracking is the process of achieving and maintaining fine alignment of the chip boundaries between the incoming and locally generated codes.

In particular, the present invention is concerned with the code tracking part of the receiving apparatus, which is generally implemented in the form of a Rake receiver.

For a digital receiver a key component is the analog-to-digital converter (ADC). In several applications the sampling clock rate cannot in any case be synchronized with the incoming signal. For example, one of these applications is a CDMA base station receiver where the sum of several signals, non-synchronous among each other, are received and digitised with a single analog-to-digital converter. In these cases, the fine timing synchronisation (i.e. the code tracking) between the received and locally generated PN code of each user must be achieved through digital methods, as it is not possible to modify the sampling clock phase.

BACKGROUND ART

The code tracking operations are performed by a Synchronisation Unit. Several types of code tracking loops have been extensively applied in practical applications and the most popular solution is the so-called Early-Late synchronizer.

Figure 1:
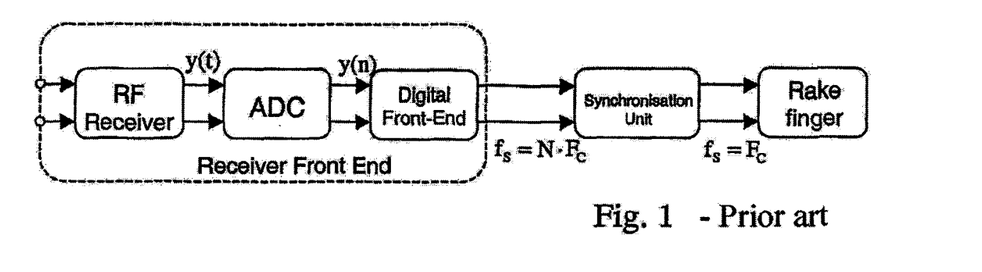
FIG. 1 is a block diagram of a prior art module of a Rake Receiver.

The Synchronisation Unit receives, as input, the baseband signal y(t) from the receiver front-end, oversampled at the frequency $f_s=N \cdot F_C$ and with at least two samples per chip ($N \geq 2$), and feeds a finger of the Rake receiver with one sample per chip (i.e. the optimal sample), as shown in FIG. 1. Each finger of the Rake receiver requires its own Synchronisation Unit because the values of timing offset of the different multi-path components demodulated by the different fingers of the Rake receiver are usually not the same.

The fine timing synchronisation can be achieved by performing some kind of interpolation among the received samples, in order to get the exact value or, at least, to approximate the received signal in correspondence of the optimal sampling instants $t_{opt}$. This technique is well known and is disclosed for example in F. M. Gardner, "Interpolation in digital modems—Part I: Fundamentals". IEEE Trans. Communications vol. 41, pp. 502-508, March 1993 or in L. Erup, F. M. Gardner, "Interpolation in digital modems—Part II: Implementation and Performance".

Figure 2:
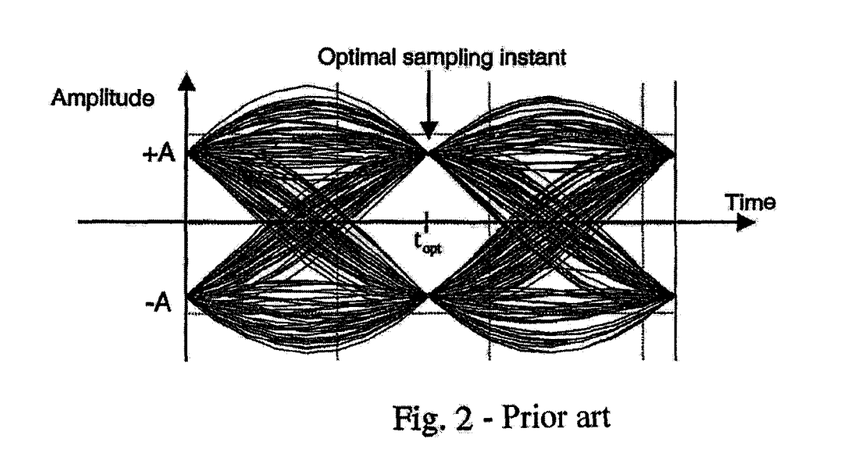
FIG. 2 is an example of an eye diagram showing an optimal sampling time instant.

The optimal sampling instant $t_{opt}(t)$ varies with time due time variant nature of the wireless channel and corresponds to the instant in which the amplitude of the received signal is maximal and, simultaneously, the Inter-Symbol Interference (ISI) is minimal. By sampling the received signal in correspondence of the optimal sampling time, it is possible to maximise the Signal to Noise Ratio (SNR) and therefore minimise the Bit Error Rate (BER) at the output of the receiver. The optimal sampling time can be observed in the eye diagram as the point of maximum opening, as shown in FIG. 2.

In the following it is described the principle of a Synchronisation Unit based on the known art. The description is based on the case of a real signal y(t), but the extension to a complex signal y(t) is straightforward.

Figure 3:
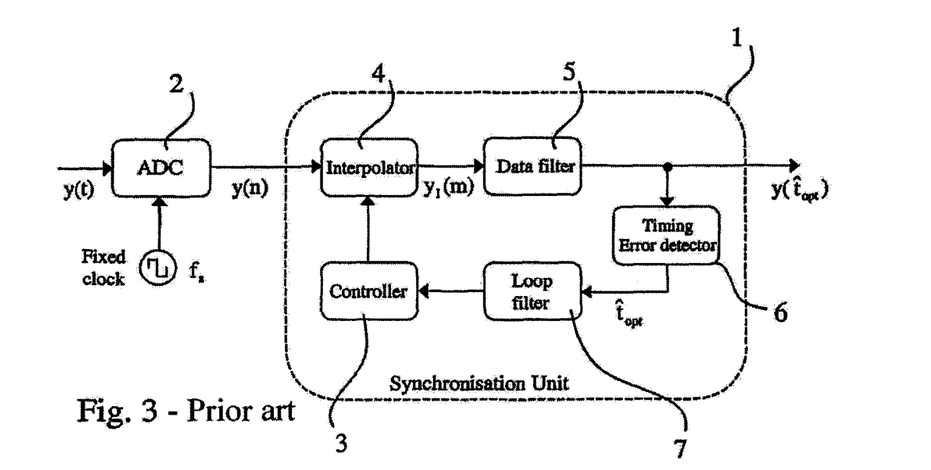
FIG. 3 is a block diagram of a prior art synchronization unit.

The block diagram of a Synchronisation Unit 1, described in the prior art is, shown in FIG. 3. The considered scheme operates with a feedback loop. A time continuous signal y(t) is received at the input of the Analog to Digital Converter 2. The signal y(t) is a sequence of pulses with period $T_C$ and shaped, for example, by a couple of root raised cosine (RRC) filters $$y(t) = \sum_{k=0}^{\infty} u_k \cdot h(t - k \cdot T_C)$$

where $u_k=\{-1,+1\}$ is the sequence of transmitted chips and h(t) is the impulse response of the equivalent Raised Cosine (RC) filter with the following expression $$h(t) = \frac{\sin\left(\frac{\pi \cdot t}{T_C}\right)}{\frac{\pi \cdot t}{T_C}} \cdot \frac{\cos\left(\alpha \cdot \frac{\pi \cdot t}{T_C}\right)}{1 - \left(2 \cdot \alpha \cdot \frac{t}{T_C}\right)^2}$$

The unilateral bandwidth of the signal y(t) is equal to $$B = \frac{(1+\alpha)}{2 \cdot T_C}$$

where $\alpha$ is the roll-off of the RRC shaping filters.

The ADC converter 2 takes samples of y(t) at uniform intervals $t_s$, which correspond to an ADC sampling frequency of $f_s=1/t_s$. The sampling of the analog baseband signal can be performed with different sampling rates. However, the Nyquist criterion requires a minimum ADC sampling rate of two times the unilateral signal bandwidth, namely $f_s \geq 2 \cdot B$.

The signal samples $y(n \cdot t_s)=y(n)$ at the output of the ADC converter 2 are provided to the interpolator 4 that computes the interpolated values $y_I(m \cdot t_I)=y_I(m)$ at intervals $t_I$. The goal of the interpolator is to increase the time resolution after the ADC conversion, so that the time spacing $t_I$ of the samples at the output of the interpolator is smaller that the time spacing $t_s$ of the samples at the output of the ADC. In general we have $$\frac{t_g}{t_1} = K$$

where K is an integer number greater than one.

Being the samples y(n) at the output of the ADC not taken in correspondence of the optimal time instant, the Synchronisation Unit must first estimate the optimal sampling instant $\hat{t}_{opt}$ and then compute or approximate the value of y(t) in correspondence of that instant. The value $y(\hat{t}_{opt})$ is then provided at the output of the Synchronisation Unit for the subsequent signal processing.

Figure 4:
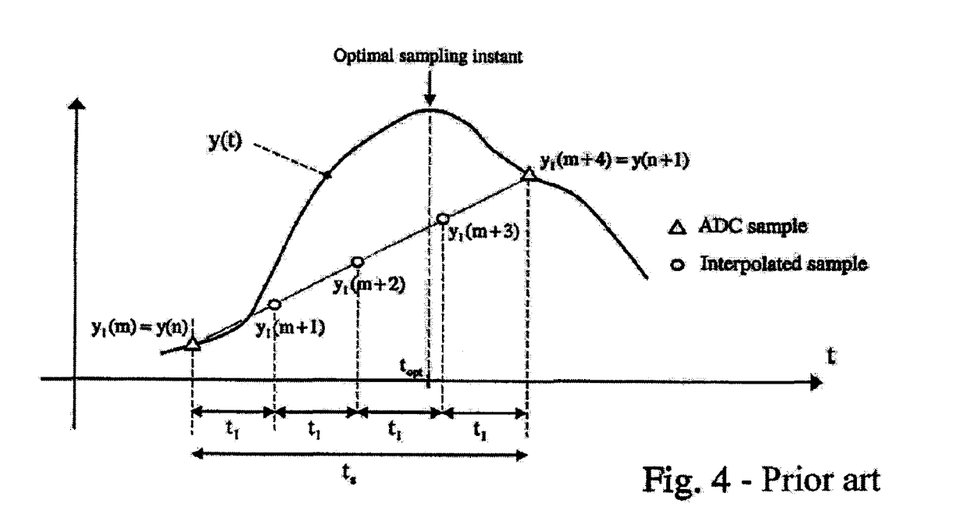
FIG. 4 is a graph showing timing synchronization by means of signal interpolation.

The principle of timing synchronisation through digital interpolation is shown in FIG. 4 for a case of linear interpolation with K=4.

In the example of FIG. 4 the signal y(t) in correspondence of the optimal sampling instant $t_{opt}$ is approximated with the interpolated value $y_I(m+3)$.

The interpolated value $y_I(m+3)$ is calculated as follows: first it is computed the middle point $y_I(m+2)$ between two consecutive samples y(n) and y(n+1) at the output of the ADC $$y_I(m+2) = \frac{y(n)+y(n+1)}{2}$$

Similarly, the other two interpolated values $y_I(m+1)$ and $y_I(m+3)$ are computed as the average between one ADC sample and the interpolated value $y_I(m+2)$ calculated in the previous step $$y_I(m+1) = \frac{y(n)+y_I(m+2)}{2} = \frac{3 \cdot y(n)+y(n+1)}{4}$$

$$y_I(m+3) = \frac{y(m+2)+y_I(n+1)}{2} = \frac{y(n)+3 \cdot y(n+1)}{4}$$

Of course, by using a more complex interpolation schemie (e.g. parabolic, cubic) or increasing the resolution of the interpolator (i.e. increasing K) it is possible to make more precise the estimate of the received signal in correspondence of the optimal sampling instant.

The synchronization unit of FIG. 3 also includes other elements that are essential for the synchronization process. A data filter 5 processes the interpolated samples and selects the optimal sample for the subsequent signal processing. The data filter is indicated within the feedback loop, but it can also be placed outside of the loop. Post-placement may be advantageous in terms of complexity when the data filter is more complicate than the interpolator and a relatively high sampling rate is employed for interpolation.

The optimal sampling instant $t_{opt}$ is estimated by a timing error detector block 6 and filtered by a loop filter 7. The goal of the loop filter is to reject the effect of noise that may affect the optimal sampling time estimate. Finally, the loop filter output drives a controller 3, which provides the control signal to the interpolator 4.

Starting from the general structure of a Synchronisation Unit, shown in FIG. 3, it is possible to analyse its application in the particular case of a digital CDMA receiver.

A known solution for performing the code tracking operations in a CDMA receiver is the so-called Early-Late synchronizer disclosed for example in John G. Proakis, "*Digital Communications*", 3$^{rd}$ edition, Mc Graw-Hill, New York, 1995.

The joint application of the interpolation and the Early-Late concept for the synchronisation of a CDMA receiver can be found in R. De Gaudenzi, M. Luise, "*A Digital Chip Tuning Recovery Loop for Band-limited Direct-Sequence Spread-Spectrum Signals*". IEEE Trans. On Communications, vol. 41, No. 11, November 1993.

An Early-Late synchronizer exploits the symmetry properties of the signal autocorrelation at the output of the receiver-matched filter.

In the following we suppose that the signal at the input of the Early-Late synchronizer is sampled with two samples per chip (N=2). Two subsequent samples at the input of the Early-Late synchronizer are then separated in time by $T_C/2$ (with $T_C=1/F_C$=chip period).

In order to introduce a suitable mathematical notation for sequences with different rates, we denote with k the discrete time index related to the chip period so that $e(k)=e(k \cdot T_C)$. We also denote with SF the spreading factor. The period of the information symbols before the spreading process is equal to $T_S=SF \cdot T_C$ and the discrete time index related to this symbol period is equal to (k div SF), where A div B is the integer part of the quotient between A and B.

Each received chip can be characterised by an early, a middle and a late samples defined as follows:

early sample: is the sample that anticipates the optimal sampling time instant. The early sample is denoted with $e_I(k)$ and $e_Q(k)$ for the in-phase and in-quadrature component respectively;

middle sample: is the sample that, in the absence of timing errors, corresponds to the optimal sample or equivalently to the peak of the received impulse h(t). The middle sample is denoted with $m_I(k)$ and $m_Q(k)$ for the in-phase and in-quadrature component respectively;

late sample: is the sample that is delayed with respect to the optimal sampling time instant. The late sample is denoted with $l_I(k)$ and $l_Q(k)$ for the in-phase and in-quadrature component respectively. The late sample of a given chip is also the early sample of the next chip.

Figure 5:
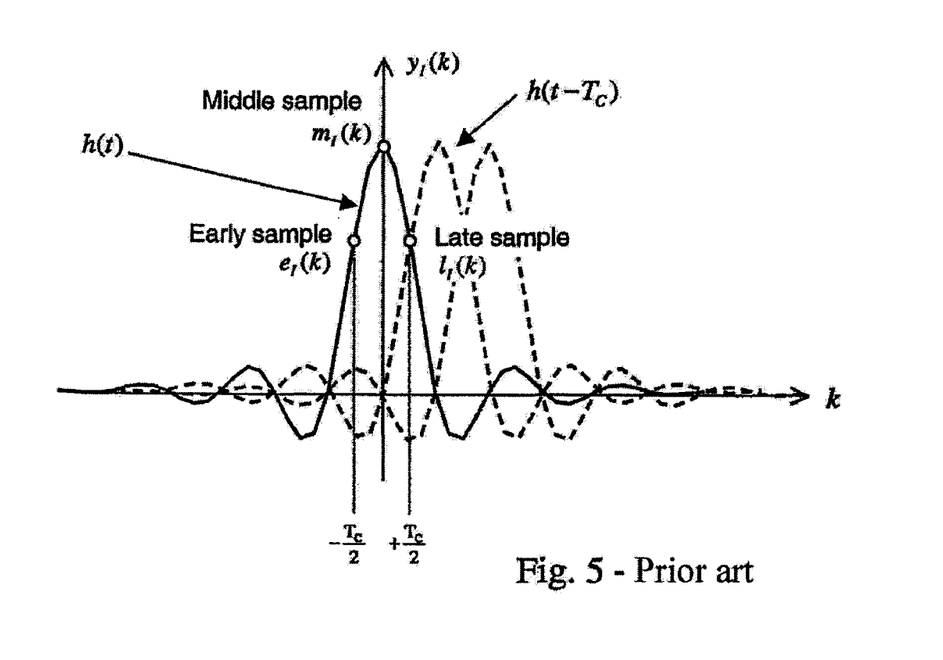
FIG. 5 is a graph showing early, middle and late samples on a received signal.

The definition of early, middle and late samples is clarified in FIG. 5 for the in-phase component and in the case of perfect timing synchronisation. From FIG. 5 it is possible to notice that the middle sample is the one with the higher energy and minimum ISL Consequently, it has to be provided to the Rake finger for the descrambling and despreading operations.

Moreover, from FIG. 5 it is possible to observe that, if the impulse response of the complete system is symmetrical and the system has achieved a perfect timing synchronisation, then the energies of the early and late samples are identical.

The two conditions of perfect timing synchronisation can be expressed as follows:

Perfect timing synchronisation $\Rightarrow \epsilon_m = m_I^2(k)+m_Q^2(k)=$ maximum Perfect timing synchronisation $\Rightarrow \epsilon_e = e_I^2(k)+e_Q^2(k) = \epsilon_l = l_I^2(k)+l_Q^2(k)$ where $\epsilon_e$, $\epsilon_m$, $\epsilon_l$ are the energies of the early, middle and late samples respectively.

In the presence of noise the identification of the sample with maximum energy is usually difficult. Instead of sampling the signal in correspondence of the peak, the Early-Late synchronizer identifies the optimal sampling instant through the second condition: the energy of the early and late samples has to be equal or, in other words, the difference between the two energies must be reduced to zero ($\epsilon_e - \epsilon_l = 0$). When such condition is fulfilled the sample between early and late (i.e. the middle) is the optimal sample to be provided to the Rake finger.

Taking into account that in a CDMA system the signal to noise ratio on the channel is very low, the condition $\epsilon_e - \epsilon_l = 0$ must be verified on the symbols after the operations of despreading and integration. Averaging over SF samples leads to mean values of the early and late sample energies and reduces the energy fluctuations due to noise and interference from other users.

Figure 6:
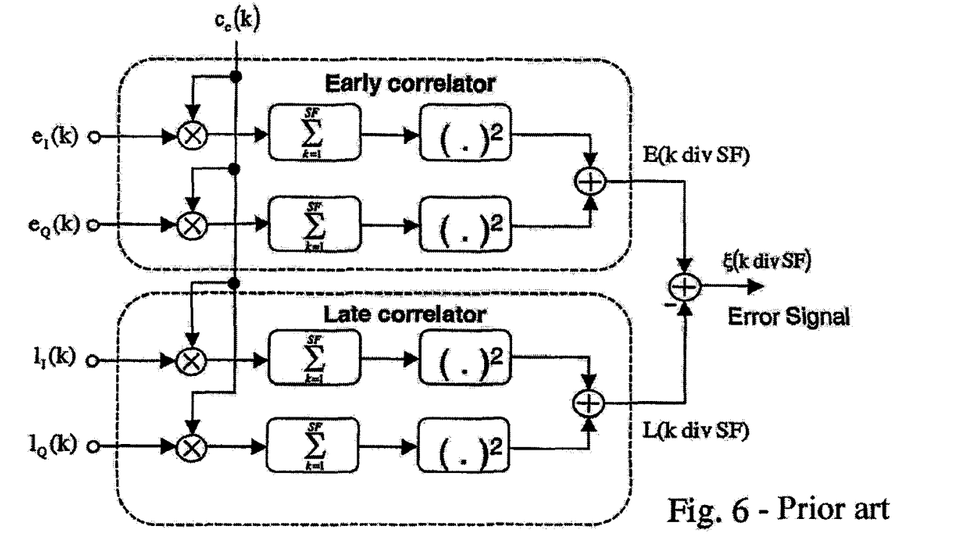
FIG. 6 is a simplified block diagram of an Early-Late synchronizer.

A simplified block diagram of a prior art Early-Late synchronizer is shown in FIG. 6 for the general case of a real PN (Pseudo Noise) code $c_e(k)$. However, the same scheme is valid in case of complex PN code by simply replacing each couple of real multiplication units with one complex multiplication unit.

The Early-Late synchronizer of FIG. 6 uses two correlators: the first performs the despreading and integrate and dump operations on the early samples while the second correlator performs the same operations on the late samples. The outputs of the two correlators are then squared in order to get the energy of the despreaded symbols, to remove the modulation of the data sequence and the phase rotation introduced by the propagation channel. Finally, an error signal $\xi$ is computed by taking the difference of the two-correlator outputs.

After the operations of despreading, integration, squaring and sum of the in-phase and in-quadrature components the error signal, for a certain timing error $\tau = t - t_{opt}$, is given by $$\xi(k \operatorname{div} SF) = E(k \operatorname{div} SF) - L(k \operatorname{div} SF)$$

Figure 7:
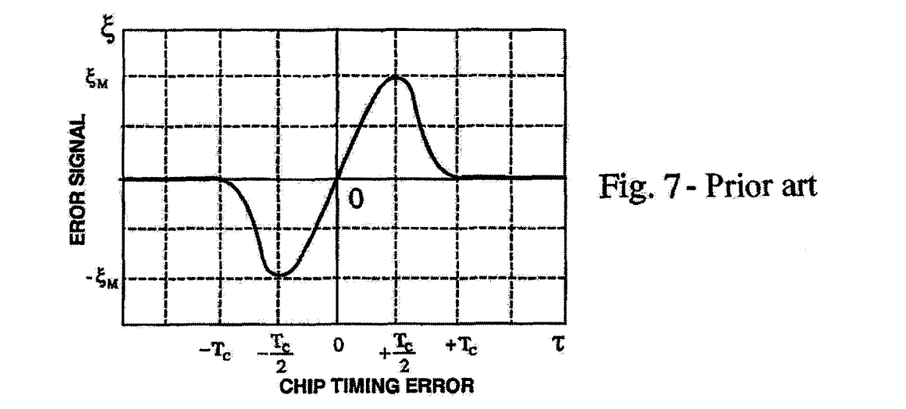
FIG. 7 is a graph of en error signal in an Early-Late synchronizer.

The characteristic of the Early-Late synchronizer in terms of error signal $\xi$ as a function of the timing error $\tau$ is shown in FIG. 7. The Early-Late characteristic, due to its particular shape, is usually referred to as S-curve.

From FIG. 7 we observe that when a timing offset is present ($\tau \neq 0$), the error signal $\xi$ at the output of the Early-Late synchronizer is nonzero and the time position of the early, middle and late samples must be delayed or advanced (depending on the sign of the error) to get the optimal sampling instant.

Figure 8:
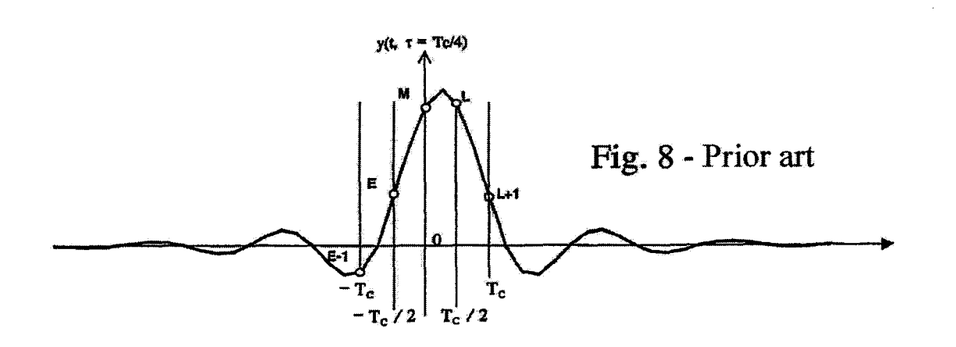
FIGS. 8 and 9 show a known principle of digital Early-Late synchronizer exploiting the interpolation.
Figure 9:
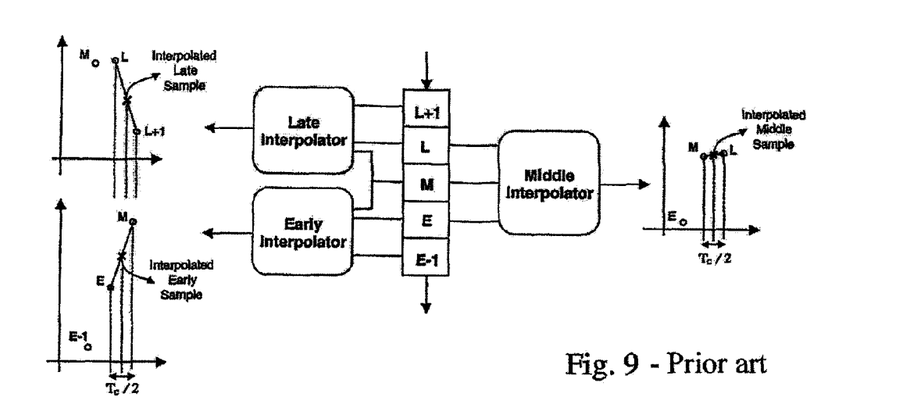

An alternative solution for finely adjusting the time position of the early, middle and late samples, without delaying or advancing their positions, consists in using three digital interpolators as shown, in the particular case of a timing offset $\tau = T_C/4$, in FIGS. 8 and 9.

Two of these interpolators are used to compute the early E and the late L samples while the-third interpolator is used to compute the middle M sample (i.e. the optimal sample with the maximum energy). The early and late samples are provided to the correlators for the computation of the error signal $\xi$, while the middle sample is provided to the Rake finger for the subsequent signal processing (descrambling, despreading, channel estimation and compensation, decoding, etc.).

If we consider in FIG. 8 the early E, the middle M and the late L samples, we observe that, by means of a linear interpolator, it is possible to generate, with a certain resolution, all the samples between two subsequent values early E and middle M or middle M and late L In the case of error signal larger than zero the optimal sampling time is delayed with respect to the middle M sample and therefore the value of the optimal sample can be computed with a linear interpolation between the middle M and the late L samples. In a similar way for an error signal lower than zero, the optimal sample is computed by means of a linear interpolation between the early E and the middle M samples.

In order to compute the delayed or advanced version of the samples early E and late L, determining the error signal, it can be necessary to interpolate the early E sample between the previous sample E−1 and the middle M sample and, in similar way, the late L sample between the subsequent sample L+1 and the middle M sample, as it is possible to observe in FIG. 9. Therefore a Synchronisation Unit based on the Early-Late synchronizer requires the knowledge of five subsequent samples E−1, E, M, L, L+1 of the incoming signal spaced of $T_C/2$ among each other.

The three interpolators are used to finely adjust the time position of the early, late and middle samples feeding the correlators and the Rake finger respectively. These interpolators are controlled by a digital signal derived from the error signal $\xi$ of the Early-Late synchronizer. If the loop is correctly designed so to obtain a negative feedback, the system automatically minimizes the error signal by converging towards the error zero condition. The minimum error condition is equivalent to say that the middle sample is the one with the maximum energy and therefore the optimal one.

The time position of the three interpolated samples (early, middle and late) is moved backward or forward by a time factor $\delta$ when the error signal is respectively positive or negative. The factor $\delta$ represents the time resolution of the interpolators and it is usually equal to $T_C/8$.

The Early-Late synchronizer is a closed loop system that reaches a steady state when the error signal is exactly zero. In practice, because of the finite arithmetic precision of the device, the error signal varies around the zero value by alternating negative and positive values.

Consequently the control signals of the interpolates, which are derived from the sign of the error signal $\xi$, oscillate around the steady state values. Such behaviour allows a continuous tracking of the optimal timing but, at the same time, introduces an undesired jitter on the time-position of the middle sample.

The timing jitter introduces a performance degradation in the whole system. A known solution for compensating such performance degradation is to increase the time resolution of the interpolators. Nevertheless such solution is rather expensive, the complexity of a digital interpolator is generally proportional to its resolution, because of the mathematical operations required to perform interpolation.

The complexity of the single interpolator affects negatively the chip area, especially in case of a base station receiver where many of these interpolators are required to process the signals of the various users. Each Rake finger of a base station needs six interpolators: early, middle and late for both signal components (I and Q). Moreover if we consider, as a possible example, a UMTS base station with 64 different Rake receivers, each with $N_f = 8$ fingers, it is then evident from these numbers that employing interpolators having reduced complexity is a remarkable advantage.

The Applicant has tackled the problem of reducing the timing jitter of the middle interpolator, without increasing the time resolution of the corresponding digital interpolator.

The Applicant observes that, alternating between negative and positive values of the error signal around the zero value, although allowing a continuous tracking of the optimal timing, does not give any positive contribution to the synchronization process. On the contrary, such behaviour introduces a timing jitter on the position of the middle sample which influences negatively the whole system performance.

In view of the above, it is an object of the invention to provide an early-late synchronizer having a reduced timing jitter. Thanks to the reduced timing jitter, it is possible to reduce the resolution of the interpolators and, consequently, the area of the silicon chip in which the system is integrated.

The above and other objects are reached by the method and the device realised according to the invention, as claimed in the accompanying claims.

SUMMARY OF THE INVENTION

The Applicant has found that, filtering appropriately the control signal of the middle interpolator, which is directly derived from the error signal ξ, the timing jitter of the same interpolator can be remarkably reduced. To this end, the interpolation unit of the device provides for a non-linear filter that smoothes the control signal of the middle interpolator, enabling the update operation of the control signal only when this effect is generated by an actual reduction of the magnitude (absolute value) of the error signal. In the opposite case, when the absolute value of the error signal at time n is equal or grater than the absolute value of the error signal at time n−1, it is assumed that the modification of the control signal is due to an undesired jitter and therefore it is more convenient to keep the previous value of the control signal.

The method and the device according to the invention allow to reduce, or even remove, the timing jitter on the middle interpolated sample, thus allowing to simplify the architecture of the interpolators and to reduce the complexity of the whole system, while maintaining optimum system performances.

A device according to the present invention will now be described in detail with reference to the UMTS (Universal Mobile Telecommunications System) systems, in the particular case of a UMTS receiver operating in the FDD mode (Frequency Division Duplex).

Figure 10:
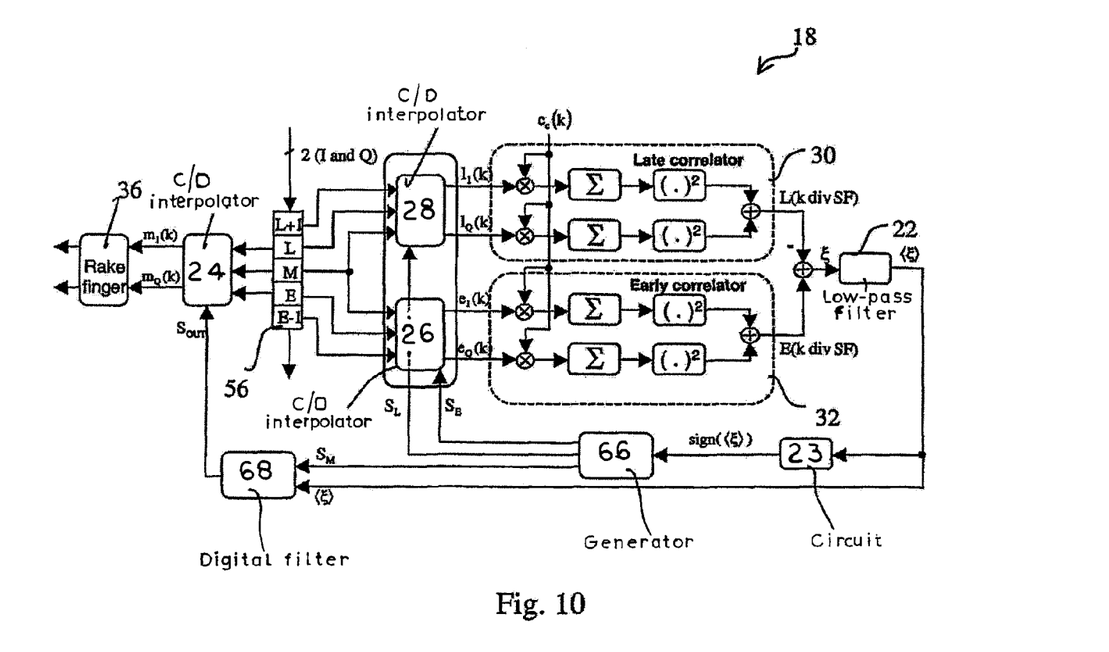
FIG. 10 is a complete block diagram of a digital Early-Late synchronizer with feedback loop, according to the invention.

A complete Early-Late synchronizer 18, which can be used in a digital communication receiver for maintaining fine alignment between an incoming spread spectrum signal and a locally generated code, is shown in FIG. 10.

The device 18 comprises:

a delay line 56 for storing a plurality of consecutive samples E−1, E, M, L, L+1 of the incoming spread spectrum signal;

a first digitally controlled interpolator 26 for determining by interpolation between consecutive samples an interpolated early sample (e) anticipating an optimal sampling time instant;

a second digitally controlled interpolator 24 for determining by interpolation between consecutive samples an interpolated middle sample (m) corresponding to the optimal sampling time instant;

a third digitally controlled interpolator 28 for determining by interpolation between consecutive samples an interpolated late sample (l) delayed with respect to said optimal sampling time instant;

a first correlator 32 performing the despreading and integrate and dump operations on the interpolated early sample (e), and a second correlator 30 performing the same operations on the interpolated late sample (l); the outputs of the two correlators are squared in order to get the energy of the despreaded symbols and to remove the modulation of the data sequence and the phase rotation introduced by the propagation channel; finally, an error signal ξ is computed by taking the difference of the two-correlator outputs;

a low pass filter 22 for averaging the error signal ξ on a certain number of symbols;

a circuit 23 for extracting the sign of the error signal ξ;

a control signal generator 66 for accumulating the sign of the error signal ξ in an internal register, for the generation of control signals $S_E$, $S_M$, $S_L$ for controlling the interpolation phases of the first 26, second 24 and third 28 digitally controlled interpolators;

a digital non-linear filter 68 for smoothing the control signal $S_M$ of the second digitally controlled interpolator 24.

The time distance between the interpolated early (e) and late (l) samples varies in relation with the control signals $S_E$, $S_M$, $S_L$, as will be explained in detail below.

The early-late synchronizer 18 is a closed loop control system whose bandwidth is relatively narrow compared to the chip rate $F_C$. The low pass filter 22, used to average the error signal ξ on a certain number symbols, determine the loop bandwidth. In order to maintain a precise code synchronisation, the loop bandwidth must be large enough to track the instantaneous delay of the correlation function but sufficiently narrow to reject the effects of noise and interference.

The system therefore automatically minimizes the error signal by converging towards the error zero condition. The minimum error condition is equivalent to say that the middle sample is the one with the maximum energy and therefore the optimal one.

Figure 11:
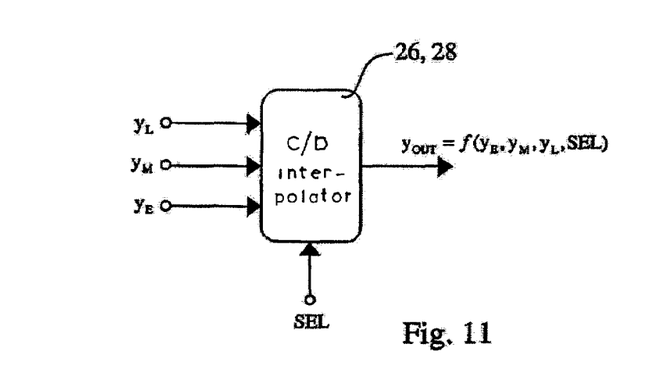
FIG. 11 is a digitally controlled interpolator used in the synchronizer of FIG. 10.

Each of the digitally controlled interpolators 24, 26, 28 is a device, as the one shown in FIG. 11, receiving three input signals, denoted as $y_E$, $y_M$, $y_L$ and a control signal denoted with SEL. The output of the interpolator $y_{OUT}$ is a function of the four inputs, $y_{OUT}=f(y_E,y_M,y_L,SEL)$.

The inputs $y_E$, $y_M$, and $y_L$ are fed with three consecutive samples of the digital signal y(t) to be interpolated (the samples stored in the delay line 56). The time position, or interpolation phase, of the interpolated sample can be selected through the control signal SEL, as will be explained later on in detail.

The middle sample is provided to the Rake finger for the further base-band processing and it has to be selected with sufficient precision in order not to reduce the performance of the receiver in terms of Bit Error Rate (BER).

The time resolution of the first 26 and third 28 digitally controlled interpolators is lower than the time resolution of the second digitally controlled interpolator 24. In the embodiment shown in FIG. 10, as the input samples are time spaced of $T_C/2$, the early and late interpolators 26, 28 have a time resolution of $T_C/4$, while the middle interpolator 24 has a resolution of $T_C/8$.

Figure 12:
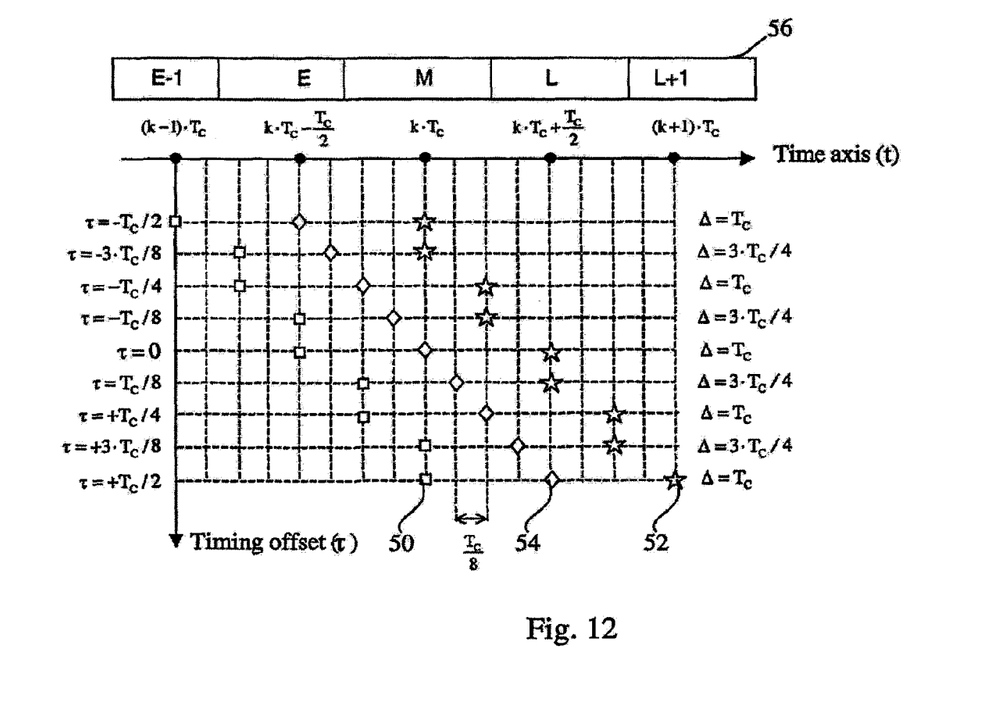
FIG. 12 is a diagram showing the Early-Late spacing as a function of timing error τ, according to the invention.

FIG. 12 illustrates five consecutive received signal samples 56 (E−1, E, M, L, L+1), time spaced of $T_C/2$ on a time axis t, and nine different interpolation patterns corresponding to nine different timing errors τ (from $\tau=T_C/2$ to $\tau=T_C/2$). The interpolated early samples are shown in FIG. 12 by square symbols 50, the interpolated middle samples by diamond symbols 54 and the interpolated late samples by star symbols 52.

As can be seen in FIG. 12, the early-late spacing Δ is variable and takes the two values $T_C$ or $3 \cdot T_C/4$, alternatively, as a function of timing error τ. The interpolated middle sample 54, computed with a resolution of $T_C/8$, is always taken as the midpoint between the early 50 and the late 52 samples in order to ensure the error signal balancing.

Figure 13:
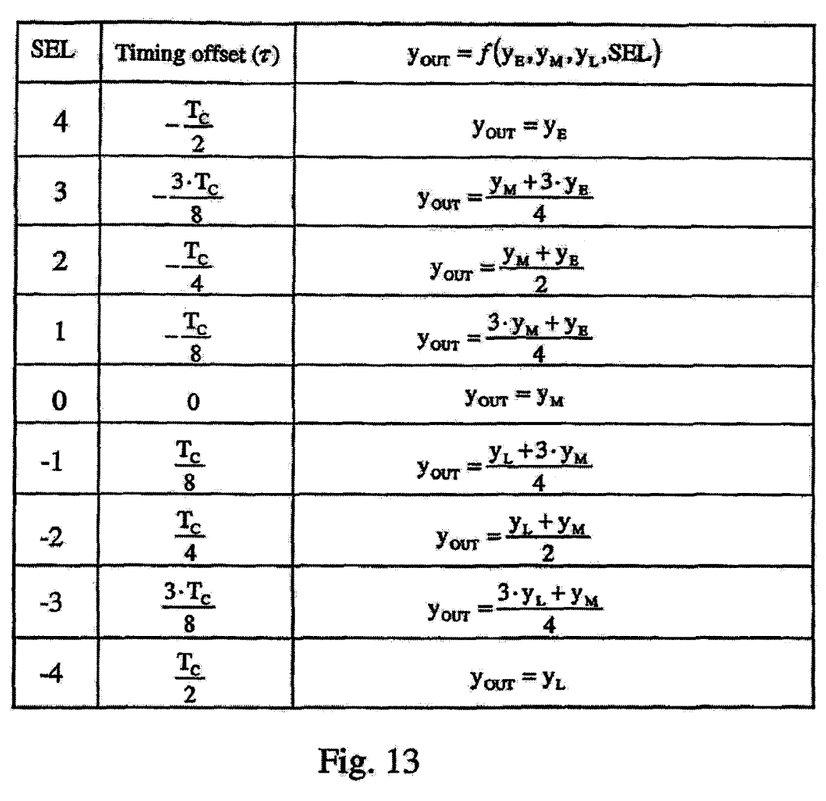
FIG. 13 and FIG. 14 are tables illustrating the mathematical operations required to perform a linear interpolation according to the invention.

The output values $y_{OUT}=f(y_E, y_M, y_L, \text{SEL})$ of the digitally controlled interpolator 24, having a time resolution of $T_C/8$ are listed in the table of FIG. 13.

Figure 14:
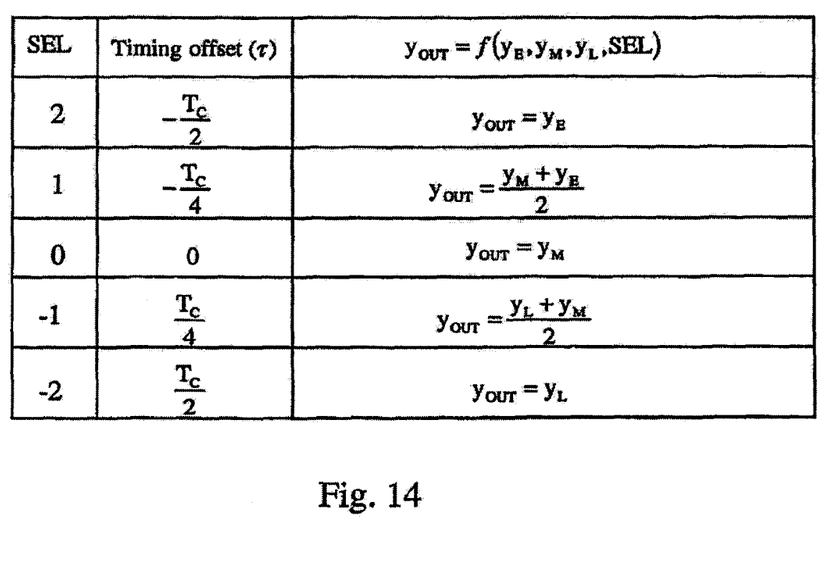

The table of FIG. 14 illustrates the output values $y_{OUT}=f(y_E, y_M, y_L, \text{SEL})$ of the digitally controlled interpolators 26, 28, having a time resolution $\delta=T_C/4$.

As it is shown in FIG. 14, the mathematical operations required to perform a linear interpolation with resolution $\delta=T_C/4$ are only sums and divisions by two (i.e. right shifts), therefore the hardware complexity of such linear interpolators is much lower than an interpolator with resolution $\delta=T_C/8$.

Figure 15:
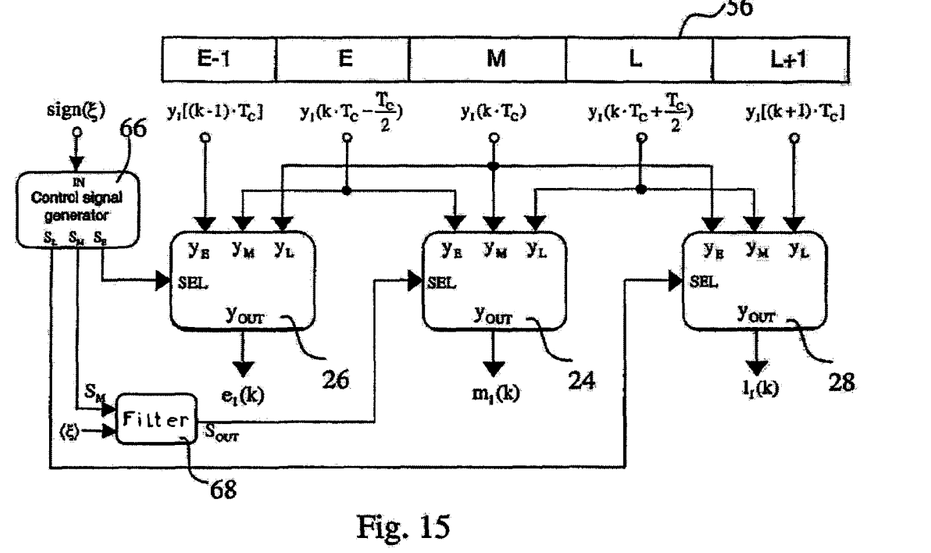
FIG. 15 is a block diagram of a complete structure of interpolators, according to the invention.

In FIG. 15 is illustrated the complete structure of the early-middle-late interpolators for one signal component. The structure has been shown for the in-phase component I of the signal, however the same structure is valid also for the in-quadrature Q components.

The block that generates the control signals for the interpolators is shown in FIG. 10 and FIG. 15 as block 66.

The control signal generator 66 receives in input the sign of the error signal ξ, computed according to the following rule $$\text{sign}(\xi) = \begin{cases} +1 & \text{if } \xi > 0 \\ 0 & \text{if } \xi = 0 \\ -1 & \text{if } \xi < 0 \end{cases}$$

and provides as output the control signals $S_E$, $S_M$ and $S_L$ for the three interpolators of the early, middle and late samples respectively. The control signals are the same for both the in-phase and in-quadrature component interpolators.

Figure 16:
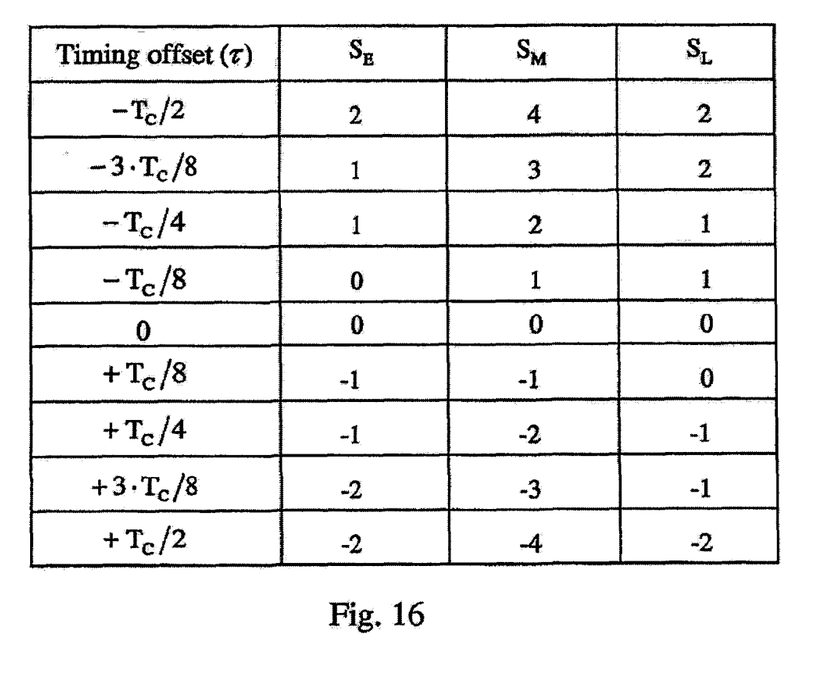
FIG. 16 is a table illustrating the values of control signals of the interpolators of FIG. 15.

The control signal $S_M$, passing through the digital filter 68 for reaching the SEL input of interpolator 24, is obtained by accumulating the sign of the error signal, with a saturation for values larger than 4 or smaller than −4. The algorithm employed for the generation of the signal $S_M$ is the following $S_M(-1)=0$ $S_M(n)=S_M(n-1)+\text{sign}(\xi)$ if $[S_M(n)>4]$ then $S_M(n)=4$ if $[S_M(n)<-4]$ then $S_M(n)=-4$ The values of the control signals $S_E$ and $S_L$ for the early and late interpolators respectively, can be derived as a function of the control signal $S_M$ from FIG. 11 and from the table of FIG. 14. In particular, the values of the control signals $S_E$, $S_L$ and $S_M$ as a function of the timing offset τ are given in the table of FIG. 16.

The expressions of the control signals $S_E$ and $S_L$ can be computed as a function of the signal $S_M$:

$$S_E = \left\lfloor \frac{S_M}{2} \right\rfloor \quad S_L = \left\lfloor \frac{S_M+1}{2} \right\rfloor$$

where the function $\lfloor \cdot \rfloor$ approximates the argument to the nearest lower integer.

According to the invention, the signal $S_M$ generated by block 66 is filtered by the digital filter 68.

The filter 68 is a non-linear filter that smoothes the control signal $S_M$ of the middle interpolator 24. The timing jitter is removed by updating the control signal $S_{OUT}$, and therefore the position of the middle interpolator, only if the absolute value of the error signal ξ(n) at time n is smaller than the absolute value of error signal ξ(n−1) at time n−l. This assumption is motivated from the fact that it is convenient to change the position of the interpolator working on the middle samples (feeding a Rake finger) only when this effect is generated by an actual reduction of the magnitude (absolute value) of the error signal. In the opposite case, when the absolute value of the error signal ξ(n) at time n is equal or greater than the absolute value of the error signal ξ(n−1) at time n−1, we assume that the modification of the control signal $S_{OUT}(n)$ is due to an undesired jitter and therefore it is more convenient to keep the previous value of the control signal $S_{OUT}(n-1)$.

Figure 17:
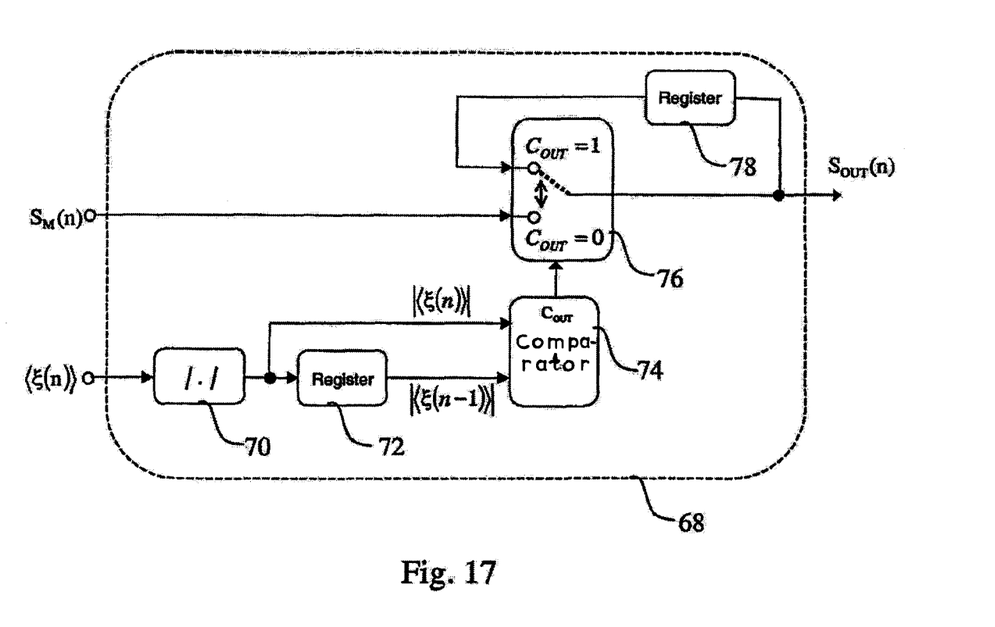
FIG. 17 is a block diagram of a digital filter used in the structure of interpolators of FIG. 15.

The structure of digital filter 68 is shown in detail in FIG. 17. The absolute value (calculated by block 70) of the error signal <ξ(n))> at time n, generated in correspondence of the values of the control signals $S_E(n)$, $S_M(n)$, $S_L(n)$ and filtered by the low pass filter 22, is compared, by the comparator block 74, with the absolute value of the previous error <ξ(n−1)>, stored in a register 72. If the module of <ξ(n)> is smaller than the module of <ξ(n−1)>, the position of the middle interpolator is updated by setting the output $S_{OUT}(n)$ of the digital filter 68 to the value of $S_M(n)$, otherwise the previous value of the output $S_{OUT}(n-1)$ is hold.

In FIG. 17 it is denoted with "n" the temporal index related to the DPCCH bit period $T_B$ so that $\xi(n)=\xi(n \cdot T_B)$, where $T_B$ is given by:

$T_B = T_C \cdot SF_{DPCCH}$

The comparator block 74 generates an output $C_{OUT}$ according to the following formula:

$$C_{OUT} = \begin{cases} 0 & \text{if } |\xi(n)| < |\xi(n-1)| \\ 1 & \text{if } |\xi(n)| \geq |\xi(n-1)| \end{cases}$$

The output of the comparator controls a switch 76 selecting the new value $S_M(n)$ or the previous output value stored in a register 78.

The device previously described allows the fine synchronization of a digital telecommunication receiver by means of a method, for maintaining fine alignment between the incoming spread spectrum signal and a locally generated code, comprising the following steps:

storing a plurality of consecutive samples E−1, E, M, L, L+1 of an incoming spread spectrum signal in a delay line 56;

determining by interpolation between consecutive samples of the incoming spread spectrum signal, by means of a first digitally controlled interpolator 26, an interpolated early sample (e) anticipating an optimal sampling time instant;

determining by interpolation between consecutive samples of the incoming spread spectrum signal, by means of a second digitally controlled interpolator 24, an interpolated middle sample (m) corresponding to the optimal sampling time instant;

determining by interpolation between consecutive samples of the incoming spread spectrum signal, by means of a third digitally controlled interpolator 28, an interpolated late sample (l) delayed with respect to the optimal sampling time instant;

calculating an error signal $\xi$ as the difference between the energy of the symbols computed from the interpolated early (e) and late (l) samples;

generating, from error signal $\xi$ a control signal $S_{OUT}$ for controlling the interpolation phase of the second digitally controlled interpolator 24.

In particular the last step, the step of generating the control signal $S_{OUT}$, comprises:.

extracting the sign of the error signal $\xi$, by means of block 66;

accumulating the sign of the error signal $\xi$ for the generation of an intermediate control signal $S_M$;

calculating the absolute value $|\xi|$ of the error signal $\xi$ at a time instant n, by means of block 70;

comparing the absolute value $|\xi(n)|$ of the error signal $\xi$ at time instant n with the absolute value $|\xi(n-1)|$ of the error signal $\xi$ at a previous time instant n−1;

updating the control signal $S_{OUT}$ to the value of the intermediate control signal $S_M$ if the absolute value $|\xi(n)|$ of the error signal at time n is smaller than the absolute value $|\xi(n-1)|$ of the same error signal at time n−1, maintaining otherwise unchanged the value of the control signal $S_{OUT}$.

The step of comparing the absolute value $|\xi|$ of the error signal $\xi$ comprises:

storing the absolute value $|\xi(n-1)|$ of the error signal $\xi$ in a first register, maintaining such absolute value $|\xi(n-1)|$ in register 72 at least until a new absolute value $|\xi(n)|$ of the error signal $\xi$ has been calculated;

comparing the new absolute value $|\xi(n)|$ of the error signal $\xi$ with the absolute value $|\xi(n-1)|$ stored in register 72, and storing the new absolute value $|\xi(n)|$ in register 72, overwriting the absolute value $|\xi(n-1)|$ previously stored.

The step of updating the control signal $S_{OUT}$ comprises:

storing the value of the previous output signal $S_{OUT}(n-1)$ in a second register 78, maintaining such value in register 78 at least until a new value of the intermediate control signal $S_M$ has been calculated;

overwriting the value of the previous output signal $S_{OUT}(n-1)$ stored in register 78 with the new value of the intermediate control signal $S_M$ if the absolute value $|\xi(n)|$ of the error signal at time n is smaller than the absolute value $|\xi(n-1)|$ of the same error signal at time n−1, maintaining otherwise unchanged the value stored in register 78.

The invention claimed is:

1. A method for fine synchronization of a digital telecommunication receiver, comprising a code tracking process for maintaining fine alignment between an incoming spread spectrum signal and a locally generated code, said method comprising:

storing a plurality of consecutive samples of said incoming spread spectrum signal in a delay line;

determining by interpolation between consecutive samples of said incoming spread spectrum signal, by means of a first digitally controlled interpolator, an interpolated early sample anticipating an optimal sampling time instant;

determining by interpolation between consecutive samples of said incoming spread spectrum signal, by means of a second digitally controlled interpolator, an interpolated middle sample corresponding to said optimal sampling time instant;

determining by interpolation between consecutive samples of said incoming spread spectrum signal, by means of a third digitally controlled interpolator, an interpolated late sample delayed with respect to said optimal sampling time instant;

calculating an error signal as the difference between the energy of the symbols computed from said interpolated early and late samples; and generating, from said error signal, a control signal for controlling the interpolation phase of said second digitally controlled interpolator and thereby synchronizing the incoming spread spectrum signal with the locally generated code;

wherein the step of generating a control signal comprises:

extracting the sign of said error signal;

accumulating said sign of said error signal for the generation of an intermediate control signal;

calculating the absolute value of said error signal at a time instant n;

comparing said absolute value of said error signal at said time instant n with the absolute value of said error signal at a previous time instant n−1; and updating said control signal to the value of said intermediate control signal if the absolute value of said error signal at time n is smaller than the absolute value of the same error signal at time n−1, maintaining otherwise unchanged the value of said control signal.

2. The method according to claim 1, wherein said step of accumulating said sign of said error signal provides that the value accumulated has a positive saturation value of +4 and a negative saturation value of −4.

3. The method according to claim 1, wherein said step of comparing said absolute value of said error signal comprises:

storing the absolute value of said error signal in a first register, maintaining such absolute value in said register at least until a new absolute value of said error signal has been calculated; and comparing said new absolute value of said error signal with the absolute value stored in said first register, and storing said new absolute value in said first register, overwriting the absolute value previously stored.

4. The method according to claim 1, wherein said step of updating said control signal comprises:

storing the value of a previous control signal in a second register, maintaining such value in said second register at least until a new value of said intermediate control signal has been calculated; and overwriting the value of said control signal stored in said second register with the new value of said intermediate control signal if the absolute value of said error signal at time n is smaller than the absolute value of the same error signal at time n−1, maintaining otherwise unchanged the value stored in said second register.

5. A digital communication receiver comprising a device for maintaining fine alignment between an incoming spread spectrum signal and a locally generated code, said device comprising:

a delay line for storing a plurality of consecutive samples of said incoming spread spectrum signal;

a first digitally controlled interpolator for determining by interpolation between consecutive samples stored in said delay line an interpolated early sample anticipating an optimal sampling time instant;

a second digitally controlled interpolator for determining by interpolation between consecutive samples stored in said delay line an interpolated middle sample corresponding to said optimal sampling time instant;

a third digitally controlled interpolator for determining by interpolation between consecutive samples stored in said delay line an interpolated late sample delayed with respect to said optimal sampling time instant;

at least one correlator for calculating an error signal as the difference between the energy of the symbols computed from said interpolated early and late samples; and a circuit for generating a control signal for controlling the interpolation phase of said second digitally controlled interpolator and thereby synchronizing the incoming spread spectrum signal with the locally generated code;

wherein the means for generating a control signal comprises:

a circuit for extracting the sign of said error signal;

a circuit for accumulating said sign of said error signal in a register, for the generation of an intermediate control signal;

a circuit for calculating the absolute value of said error signal at a time instant n;

at least a comparator for comparing said absolute value of said error signal at said time instant n with the absolute value of said error signal at a previous time instant n−1; and a controllable switch for updating said control signal to the value of said intermediate control signal if the absolute value of said error signal at time n is smaller than the absolute value of the same error signal at time n−1, maintaining otherwise unchanged the value of said control signal.

6. The digital communication receiver according to claim 5, wherein said register in which is accumulated the sign of said error signal has a positive saturation value of +4 and a negative saturation value of −4.

7. The digital communication receiver according to claim 5, wherein said at least one comparator for comparing said absolute value of said error signal comprises:

a first register for storing the absolute value of said error signal at a time instant n−1, maintaining such absolute value in said register at least until a new absolute value of said error signal has been calculated; and a comparator for comparing said new absolute value of said error signal with the absolute value stored in said first register, generating a signal indicating whether said new absolute value is smaller than the previously stored absolute value.

8. The digital communication receiver according to claim 7, wherein said controllable switch for updating said control signal comprises:

a second register for storing the value of a previous control signal, maintaining such value in said register at least until a new value of said intermediate control signal has been calculated; and a switch, controlled by the signal generated by said comparator, for storing in said second register a new value of said control signal, if said new absolute value is smaller than the previously stored absolute value, or for leaving unaltered the value stored in the same register if such condition is not verified.

* * * * *